Jan. 14, 1941. W. A. ROSS 2,228,286
DRILLING DEVICE
Filed April 5, 1938
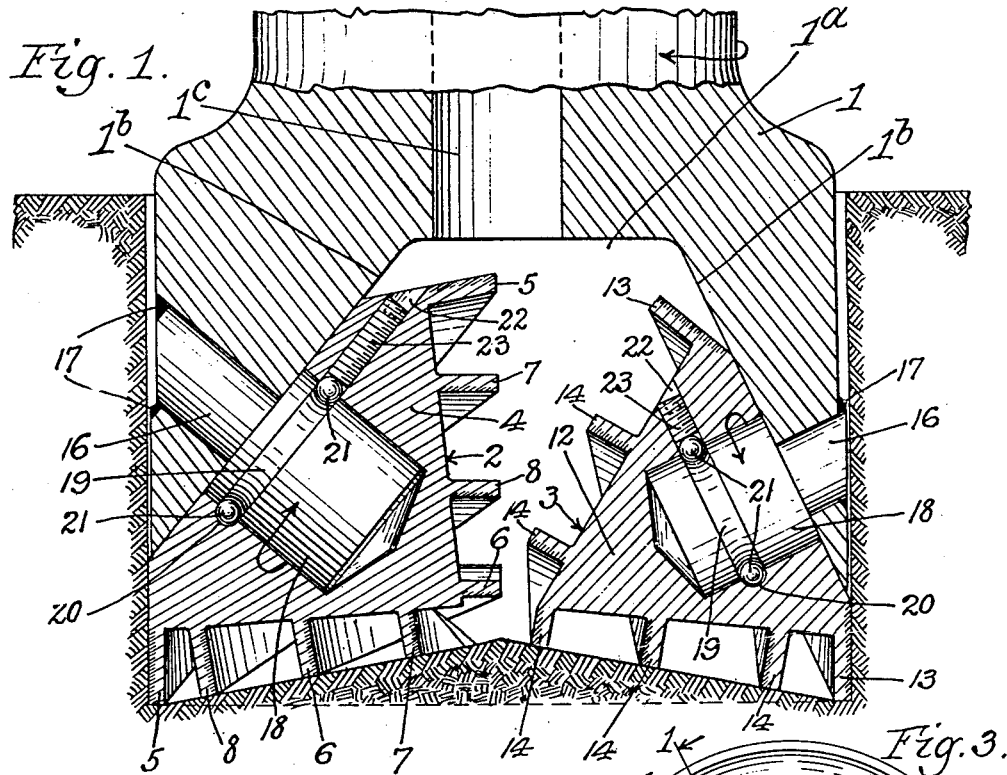
Inventor
Warren A. Ross
by Parker & Carter
Attorneys.

Patented Jan. 14, 1941

2,228,286

UNITED STATES PATENT OFFICE 2,228,286

DRILLING DEVICE

Warren A. Ross, Haverhill, Mass., assignor to Donald M. Carter, Chicago, Ill.

Application April 5, 1938, Serial No. 200,210

9 Claims. (Cl. 255—71)

This invention relates to drilling devices for use in connection with oil wells or mines or the like and has for its object to provide a new and improved device of this description.

The invention has as a further object to provide a drilling device which will have a very high efficiency and will have a longer use before being dulled or worn out than is now possible with drills of this type. The invention has as a further object to provide a drill by means of which a hole of substantially uniform diameter can be drilled.

The invention has as a further object to provide a drilling device having a substantially conical shaped cutter or cutting device, having a continuous outer cutting edge and a spiral cutting edge extending to the center of the cutter. The invention has as a further object to provide a drilling device with a substantially conical shaped cutter having continuous cutting edges which act by crushing the material to be removed.

The invention has other objects which are more particularly pointed out in the accompanying description.

Referring now to the drawing, Fig. 1 is a view of one form of drilling device in part section embodying the invention, the section of the cutter at the left being on line 1—1 of Figure 2, and the section of the cutter at the right being on line 1—1 of Figure 3;

Fig. 2 is a view of the large cutter shown on the lefthand of Fig. 1, as seen by looking directly at the apex thereof; and Fig. 3 is a view of the small cutter shown on the righthand of Fig. 1, as seen by looking directly at the apex thereof.

Like numerals refer to like parts throughout the several figures.

Referring now to the drawing, I have illustrated a drilling device comprising a cutter holder 1. Rotatably connected with the cutter holder are a plurality of cutting devices. In the drawing I have illustrated two of these cutting devices, 2 and 3, but any desired number may be used. The cutting device 2 is a conical shaped cutting device having the conical shaped body portion 4. There is a continuous outer cutting projection 5 which extends entirely around the cutting device and which is substantially the same thickness throughout its depth. There are a plurality of inner spiral cutting projections 6, 7 and 8, having spiral cutting edges each of which is continuous. The cutting projection 6 is connected at 9 with the outer cutting projection 5 and the cutting projection 7 is connected at 10 with the outer cutting projection 5 and the cutting projection 8 is connected at 11 with the outer cutting projection 5.

It will be noted that the cutting edges of the cutting projections are substantially thin cutting edges of substantially the same thickness throughout, so that they act as cutting edges until entirely worn down to the body portion 4. It will further be noted that they do not get duller as they wear. All of the cutting projections are preferably integral with the body portion 4.

The cutting device 3 has a conical shaped portion 12 and an outer cutting projection 13 which is continuous and extends all the way around. There is an inner single spiral cutting projection 14 which is connected with the outer cutting projection 13 at 15 and which extends around in a spiral shape to the apex portion of the conical shaped portion 12. This single spiral cutting projection is preferably integral with the body portion 12.

The cutting devices may be attached to the cutter holder in any desired manner. The cutter holder for this purpose is recessed at 1a and is provided with inclined faces 1b which are inclined inwardly from the bottom toward the upper part thereof. As herein shown, they are rotatably connected to the cutter holder upon said inclined faces 1b. For this purpose there is provided an attaching member 16 which is preferably fixed to the cutter holder in any desired manner, as by being brazed thereto as shown, for example, at 17, or connected thereto in any other desired manner. This attaching member has an enlarged end 18 which projects into the body portion of the cutting devices. It is provided with a groove 19 and there is a similar groove 20 in the cutting device. Balls 21 for a ball bearing are preferably located in these grooves and are inserted through one or more openings 22. There is a screw plug 23 in each opening which prevents the balls of the ball bearing from accidentally coming out.

I have shown in the drawing the cutting device 3 as being smaller than the cutting device 2, although of course they may be of the same size if desired. I may also use a plurality of cutting devices like that of the cutting device 2, or like that of the cutting device 3, instead of having the two different forms in one apparatus. The cutting devices when in operation rotate on the cutter holder. The spiral cutting projections are so proportioned as to wear equally with the outer edge so that the outer edge is continually applying a cutting or crushing pressure on the material to be removed. It will be noted that there is a continuous outer cutting edge continuously applied to the material to be cut. In this construction the weight is substantially equally applied to the continuous outer cutting projections and the inner cutting projections. I prefer to harden one side of each cutting projection so that the hardened part will wear away slowly and by this means I get a sharper cutting edge, although this is not essential. I have indicated the outer cutting edge as being hardened on the outer face and the inner cutting edges as being hardened on the inner faces, as indicated by the close parallel lines, although either the outer or the inner parts may be hardened as desired. By this means I can use a very much harder material and still have a thin cutting edge that withstands the pressure without breaking. When the outer edge of the outer cutting projection is hardened, the rolling around of the outer cutting projections tends to move the outer cutting projection from the outer edge of the hole and this causes the inner edge of the cutting projection, which is of softer material, to wear away more rapidly than the outer edge. This provides a still thinner cutting edge. The outer cutting edge is therefore a self-sharpening cutting edge, that is, it maintains its thin cutting edge as it wears away. The material acted upon is in reality ruptured or crushed by the cutting edge and is not cut, as would be the case with other cutting devices.

The outer face of the outer cutting projection at the point opposite the wall of the well is tangent to this wall and the outer faces of the two opposed cutting projections are separated by a distance equal to the inside diameter of the hole being drilled. The cutting edge of the outer cutting projection, whatever the shape thereof, is continuous and whatever may be the position of the inner face of the cutting projection, the outer face at the point where it contacts with the inner wall of the hole being drilled is substantially tangent throughout to such inner wall.

I have described the spiral cutting projections as connecting with the outer cutting projection, but it is of course evident that it is only necessary that they be connected to the body of the cutter, without being connected to the outer cutting projections.

I have referred in the specification and claims to the parts which engage the bottom of the well as cutters and their action as cutting, and I mean to include by these terms any action of the parts by means of which the material being acted upon is loosened by crushing, rupturing, breaking up or otherwise disintegrated so that it may be removed. This device can of course be used to make a horizontal tunnel or opening.

Any suitable means for directing water to the cutters so as to cause the material that is loosened to be displaced and moved up to the top of the well, may be provided. I have simply shown a passageway *1c* for this purpose. The liquid passes down this passageway and around the cutters and then up along the side of the cutter holder *1* and to the point where it is deposited. When the cutter holder, for example, is rotated in the direction of the arrow shown in Fig. 1, the drag of the cutters on the material to be cut will cause them to rotate in the direction of the arrows shown on these cutters.

I have shown in detail a particular construction embodying the invention, but it is of course evident that the parts may be varied in many particulars without departing from the spirit of the invention as embodied in the claims hereto appended, and I therefore do not limit myself to the particular construction shown.

I claim:

1. A drilling device for drilling a hole comprising a conical shaped cutting device having a conical shaped body portion and a continuous outer cutting projection extending around the conical shaped body portion and having a cutting edge which engages the bottom of the hole, and inner cutting projections projecting from the body portion in the same general direction as the outer cutting projection, said cutting projections being spaced apart at the point where they are connected with the conical shaped body portion by an intervening face of said body portion and integral with said body portion.

2. A drilling device for drilling a hole comprising a conical shaped cutting device having a conical shaped body portion and a continuous outer cutting projection extending around the conical shaped body portion having a cutting edge which engages the bottom of the hole and inner spiral cutting projections projecting from the body portion and integral therewith, said cutting projections being substantially the same width from their outer edges to the point where they connect to the body portion.

3. A drilling device for drilling a hole comprising a conical shaped cutting device having a conical shaped body portion and a continuous outer cutting projection extending around the conical shaped body portion and having a cutting edge which engages the bottom of the hole, and a spiral cutting projection inside of the outer cutting projection and extending spirally around the conical body portion and integral therewith.

4. A drilling device comprising a conical shaped cutting device having a conical shaped body portion and a continuous outer cutting projection extending around the conical shaped body portion, and a spiral cutting projection inside of the outer cutting projection and extending spirally around the conical body portion and integral therewith, said spiral cutting projection having an integral connection with the outer cutting projection.

5. A drilling device comprising a conical shaped cutting device having a conical shaped body portion and a continuous outer cutting projection extending around the conical shaped body portion, and a plurality of spiral cutting projections inside of the outer cutting projection and extending spirally around the conical body portion and integral therewith, said spiral cutting projections having integral connections with the outer cutting projection.

6. A drilling device for drilling a hole comprising a conical shaped cutting device having a conical shaped body portion and a continuous outer cutting projection extending around the conical shaped body portion and having a cutting edge which engages the bottom of the hole, and inner cutting projections projecting from the body portion and integral therewith, said cutting projections being spaced apart at the point where they are connected with the conical shaped body portion by an intervening face of said body portion, one side of said cutting projections being made of hardened material so as to be harder than the other side thereof, the hardened and unhardened portions extending along the cutting projections to the cutting edges thereof, so that the unhardened portion wears away first to maintain a sharp cutting edge on the cutting projections when the device is in use.

7. A drilling device for drilling a hole comprising a plurality of conical shaped cutting devices, a recessed cutter holder having inclined faces inclined inwardly from the bottom toward the upper part thereof, said cutting devices being rotatably mounted in said cutter holder and upon said inclined faces said cutting devices each having an outer continuous curved cutting projection extending all the way around the cutting device, said cutting projection having a cutting edge which has a cutting engagement with the material at the bottom of the hole and an outer face at an angle thereto, which, when at the cutting point, is substantially parallel with the outer face of said cutter holder.

8. A drilling device comprising a conical shaped cutting device having a pointed conical shaped body portion and a continuous outer cutting projection extending around the conical shaped body portion, and a plurality of spiral cutting projections inside of the outer cutting projection and extending spirally around the conical body portion and integral therewith, the spiral cutting projections on the inside of the outer cutting projection having their ends brought together at the point of said conical shaped body portion.

9. A drilling device for drilling a hole comprising a conical shaped cutting device having a conical shaped body portion and a continuous outer cutting projection extending around the conical shaped body portion, and having a face which engages the wall of the hole and a cutting edge which engages the bottom of the hole, the engaging cutting edge of said cutting projection which engages the bottom of the hole being continuous.

WARREN A. ROSS.